Oct. 11, 1955   R. D. WOLF   2,720,028
INSPECTOR'S CHECKING OVERLAY
Filed Feb. 21, 1952
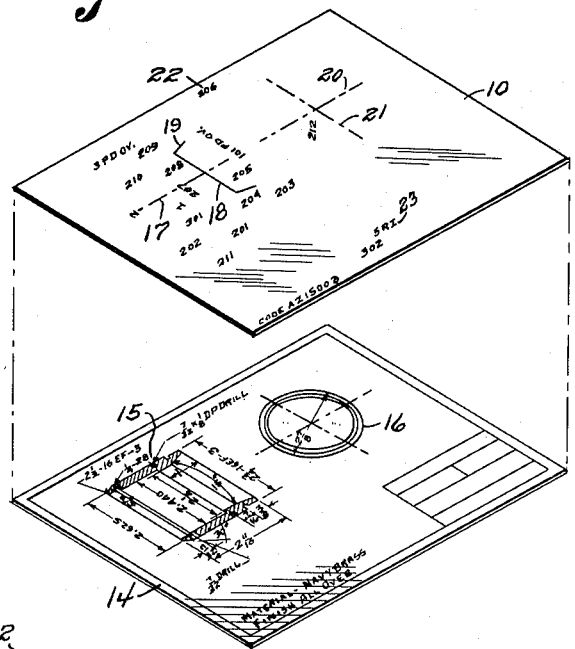
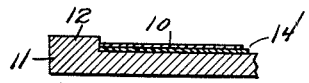
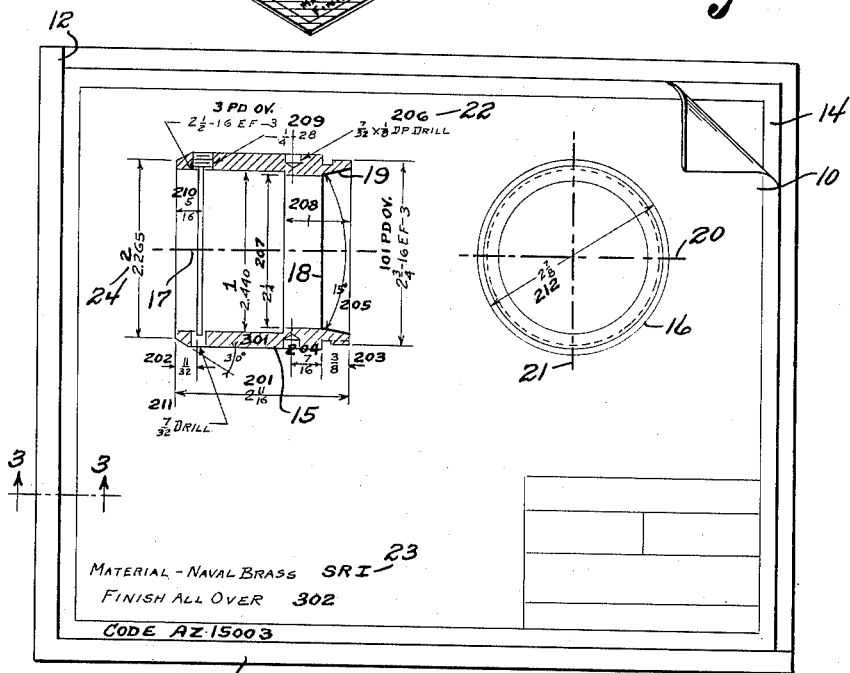
INVENTOR.
Robert D. Wolf
BY Victor J. Evans & Co.
ATTORNEYS

United States Patent Office 2,720,028
Patented Oct. 11, 1955

2,720,028

INSPECTOR'S CHECKING OVERLAY

Robert D. Wolf, Brooklyn, N. Y.

Application February 21, 1952, Serial No. 272,863

1 Claim. (Cl. 33—1)

This invention relates to devices used by persons checking machine parts such as from a production line or where parts are manufactured in different plants and assembled in other plants, and in particular an overlay in the form of a transparent sheet adapted to be positioned on a drawing such as of a machine part and having dimensions thereon and the overlay is provided with numerals or characters of a code indicating to the inspector the dimensions and indicia required to be checked.

The purpose of this invention is to facilitate the inspection of machine parts particularly where certain dimensions, such as the dimension of the outside of a part are to be checked by one inspector and the dimensions of the inside checked by another.

In the usual procedure of checking, machine parts a plurality of said parts are assigned to an inspector who measures the parts with micrometers, calipers and the like and compares the dimensions of the parts with the dimensions on a drawing. Drawings of this type contain dimensions of parts that should be checked to a ten-thousandth of an inch and also dimensions that may be checked to different tolerances such as to one-hundredth of an inch. The inspector usually studies the drawing and with his knowledge of the parts checks the dimensions accordingly. With this procedure there is always the possibility of checking the wrong dimension and also of overlooking a condition where a very close tolerance is essential. With this thought in mind this invention contemplates a transparent or frosted sheet having indicia positioned to register with dimensions and other indicia of a drawing wherein with said sheet positioned over a drawing the indicia thereon indicates to an inspector the numeral required to be checked and with the indicia on the transparent sheet arranged in code the tolerance allowed for each dimension may be designated.

The object of this invention is, therefore, to provide means for readily indicating to a checker of machine parts critical dimensions to be checked and also particular instructions to be followed in checking the parts.

Another object of the invention is to provide an overlay or transparent sheet to be positioned over a drawing having dimensions thereon to indicate critical dimensions in which dimensions to be checked correctly may be indicated on the overlay and wherein the check marks may be erased or removed without removing code indicia and the like thereon.

A further object of the invention is to provide a checking board having an overlay in combination therewith wherein dimensions of a drawing of a machine part or the like to be checked may be indicated in which the device is of a simple and economical construction.

With these and other objects and advantages in view the invention embodies a partially transparent overlay having indicia thereon positioned to register with indicia of a drawing over which the overlay may be positioned and means for retaining the partially transparent sheet in registering relation with the drawing.

Other features and advantages of the invention will appear from the following description taken in connection with the drawing, wherein:

Figure 1 is a view showing the drawing with a code carrying transparent sheet or overlay having parts thereon adapted to register with parts of the drawing elevated to a position above the drawing.

Figure 2 is a plan view showing the overlay positioned on the drawing and wherein the code indicia are shown with heavy lines and the indicia or dimensions of the drawing to which the code indicia refer shown in comparatively light lines.

Figure 3 is a detail showing a section taken on line 3—3 of Fig. 2 showing the overlay or transparent sheet positioned on a drawing and with the drawing and overlay positioned against the ledge at one edge of a board for retaining the parts in registering relation.

Referring now to the drawing wherein like reference characters denote corresponding parts the improved inspector's checking overlay of this invention includes a sheet 10 of transparent or partially transparent material and a board or base 11 having a ledge 12 on one side and a similar ledge 13 on another side whereby with the ledges 12 and 13 elevated slightly above the board 11 a drawing, as indicated by the numeral 14 may be positioned on the board with the side and end against the ledges of the board whereby upon positioning the overlay 10 upon the drawing with the corresponding side and end abutting the ledges 12 and 13 the overlay will be in registering relation with the drawing, so that code characters on the overlay register with the dimensions and other indicia of the drawing.

With the parts as illustrated in the drawing, a drawing of a bushing or cylindrical member 15 is shown in section on the drawing or sheet 14 wherein a longitudinal section is shown through the part 15 on one part of the sheet and an end view, as indicated by the numeral 16 is also provided on the sheet.

To further facilitate registering the parts the longitudinal center lines, as indicated by the numeral 17 may be placed on the transparent sheet and lines 18 and 19 indicating the inner end surface of the part may also be provided on the sheet.

The end view may also be provided with a center line 20 corresponding to the line 17 and a vertically disposed center line 21 and with the member 10 positioned upon the drawing or sheet 14 so that the center lines are in registering relation the code numerals or other indicia, as indicated by the numeral 22 will be positioned in registering relation with the demensions of the part 15 as shown on the drawing.

In addition to the indicia corresponding with the dimensions of the drawing other indicia, characters, symbols, or the like, as indicated by the numeral 23 may also be provided on the overlay or sheet 10 to indicate that certain notes or other specifications should be taken into consideration.

The indicia 22 representing code indicia of the dimensions may be coded to indicate different tolerances, such as a single digit may indicate a highly important or particularly accurate dimension, two digits may indicate a different condition and three digits in a certain range of numerals may indicate another condition whereas three digits in a different range of numerals may indicate a still further condition.

In addition to the above the overlay or transparent sheet may also indicate the type of instrument to be used in checking, such as a gauge, micrometer, or calipers.

It will also be understood that different designations, such as underscoring, the characters, as shown at the point 24, may be used on the overlay.

With the parts arranged in this manner the overlay which is preferably formed of celluloid, plastic, or other suitable material is prepared with characters or other indicia printed or otherwise provided thereon and this indicia may be used in combination with center lines or other locating lines of a drawing over which the overlay may be positioned. With the overlay positioned over a drawing a checker knows instantly which dimensions are to be checked and to how close tolerances the parts are to be checked.

It is preferred to provide the transparency or overlay of the same size as that of the drawing and with the drawing positioned on the board 11 the drawing may first be positioned with one end against the ledge 12 and the lower side against the ledge 13 and, with the drawing in position the overlay is positioned over the drawing with the end and lower side against the ledges as illustrated in Fig. 2, whereby the overlay and drawing will be in registering position.

It will be understood that other means may be used for positioning the overlay in relation to the drawing to facilitate an inspector using the overlay in combination with the drawing.

A plurality of overlays may be provided for the same drawing whereby one set of dimensions may be checked by one inspector and another set by another inspector; or wherein one set of dimensions may be checked with one instrument and another with a different instrument.

With the overlay or transparency correctly positioned on the drawing an inspector may readily check the machine part or other device and as the dimensions are checked check marks, may be placed on the surface of the overlay to indicate that the dimensions have been checked. After use of the device these check marks may readily be erased or otherwise removed.

It will be understood that although the transparent checking sheet has been referred to as used for checking machine parts from drawings, it is also adapted for use in checking other objects and devices, such as specifications, drawings, and articles of manufacture, and the like.

It will be understood that modifications may be made in the design and arrangement of the parts without departing from the spirit of the invention.

What is claimed is:

As an article of manufacture, a substantially transparent sheet of material for use over a drawing of a detail of an object with the drawing having dimension lines and dimensions thereon, said sheet of material having stiffness, and said sheet of material having numerals representing dimensions of the parts of the object on the drawing and said dimensions being positioned to correspond with the dimensions of said drawing, whereby with the sheet of material positioned over the drawing the dimensions on the drawing are adapted to be checked by the dimensions on the sheet of material, a frame having side and end members with a continuous recess for receiving the edge of a drawing and also having elevated portions extended on one side and across one end whereby with a side and end of the drawing positioned against the elevated portion and with the corresponding side and end of the sheet of material positioned against said side and end portions of the frame the dimensions of the sheet of material will be in registering relation with corresponding dimensions of the drawing.

References Cited in the file of this patent
UNITED STATES PATENTS

| | | |
|---|---|---|
| 855,217 | Ansell | May 28, 1907 |
| 1,313,082 | Fraser | Aug. 12, 1919 |
| 2,013,603 | Dalton | Sept. 3, 1935 |
| 2,140,914 | Kothny | Dec. 20, 1938 |
| 2,190,582 | Wolf | Feb. 13, 1940 |
| 2,328,480 | Mawicke | Aug. 31, 1943 |

OTHER REFERENCES

"Photo-Record Magnetic Single Shot Survey Instrument," published by Alexander Anderson, Inc., Fullerton, Colo., 1934. (Page 10 relied on. Copy in Div. 66.)